United States Patent

Uemura et al.

[15] 3,654,397

[45] Apr. 4, 1972

[54] SYSTEM FOR PRODUCING AN ELECTRICAL OUTPUT SIGNAL IN CORRESPONDENCE WITH A MAGNETIC RECORDING

[72] Inventors: Saburo Uemura, Kanagawa; Yoshitaka Hashimoto, Tokyo, both of Japan

[73] Assignee: Sony Corporation, Tokyo, Japan

[22] Filed: Mar. 20, 1970

[21] Appl. No.: 21,285

[30] Foreign Application Priority Data

Apr. 9, 1969 Japan....................................44/27844

[52] U.S. Cl. ..............................179/100.2CF, 179/100.2 CB

[51] Int. Cl...........................................G11b 5/30, G11b 5/08

[58] Field of Search..................324/43 R, 34; 179/100.2 CB, 179/100.2 CF; 340/174.1 F, 174.1 H, 174.1 K

[56] References Cited

UNITED STATES PATENTS

| | | | |
|---|---|---|---|
| 2,743,320 | 4/1956 | Daniels et al. | 179/100.2 CB |
| 3,087,026 | 4/1963 | Daniels | 179/100.2 CB |
| 2,897,267 | 7/1959 | Prince | 340/174.1 F |
| 2,546,850 | 3/1951 | Chancenotte | 179/100.2 |
| 3,051,796 | 8/1962 | Gratian | 179/100.2 CB |
| 3,218,618 | 11/1965 | Warren | 340/174.1 F |

*Primary Examiner*—Rudolph V. Rolinec
*Assistant Examiner*—R. J. Corcoran
*Attorney*—Lewis H. Eslinger, Alvin Sinderbrand and Curtis, Morris & Safford

[57] ABSTRACT

In a magnetic field detecting system having a dual-gap, magnetic flux responsive head and a magnetic flux generating source magnetized in directions across the gaps of the head, the source and head are moved relative to each other in a direction at right angles to the direction of magnetization, and such magnetization has a pattern that varies along the source considered in the direction of relative movement so that the output of the head may provide a signal of any desired wavelength limited only by the magnetization pattern.

15 Claims, 21 Drawing Figures

SYSTEM FOR PRODUCING AN ELECTRICAL OUTPUT SIGNAL IN CORRESPONDENCE WITH A MAGNETIC RECORDING

This invention relates generally to magnetic field detecting systems, and particularly to such systems in which a dual-gap magnetic flux responsive head detects the direct magnetic flux from a source thereof.

Magnetic field detecting systems of the described type have been proposed in which the magnetic flux source is displaced relative to the head in the direction across the gaps of the latter and is magnetized in the same direction with the polarity of the magnetization alternating periodically in the direction of such relative displacement. Such an arrangement is limited as to the wave length of the output signal that may be derived from the head in response to direct magnetic flux received thereby from the source.

Accordingly, it is an object of this invention to provide a system of the described type from which a signal of any desired wavelength may be derived.

Another of magnetization is to provide a system of the described type capable of producing an output signal of any desired wave form dependent only on a predetermined pattern of magnetization so as to permit the use of that output signal for controlling a function, for example, of an automated machine, process or the like, in accordance with a desired program.

Still another object is to provide a system, as aforesaid, in which the control program may be conveniently varied or changed at will.

In accordance with an aspect of the invention, the magnetic flux generating source is magnetized in directions across the gaps of the dual-gap magnetic flux responsive head and the relative displacement of the source and head is effected in a direction at right angles to the directions of magnetization, with such magnetization having a pattern that varies along the source considered in the direction of relative movement so that the output of the head may provide a signal of any desired wavelength and wave form determined by the magnetization pattern.

In accordance with the invention, the variations in the pattern of magnetization may be determined by the shape of the magnetic flux generating source considered in the direction of the relative displacement or by reversals of the directions of magnetization, or by a combination thereof.

The above, and other objects, features and advantages of this invention, will be apparent in the following detailed description of illustrative embodiments thereof which is to be read in connection with the accompanying drawings, wherein.

Figure 1:
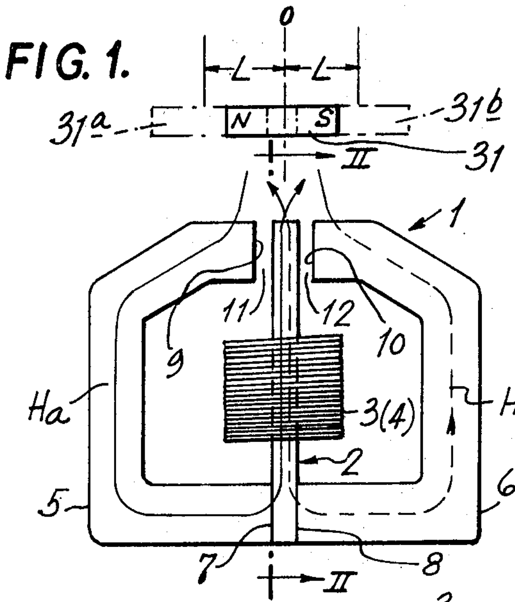
FIG. 1 is a schematic elevational view showing a dual-gap magnetic flux responsive head of a type that may be used in systems according to this invention, and which is shown in proximity to a magnetic flux generating source.
Figure 2:
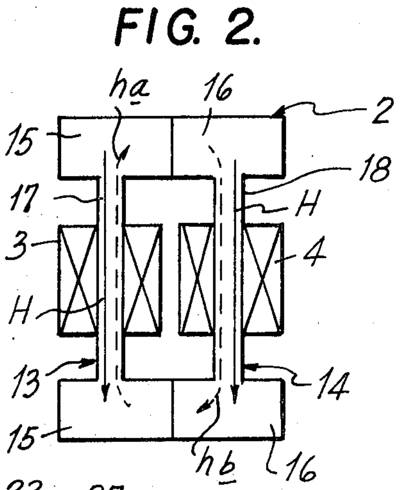
FIG. 2 is a sectional view taken along the line II—II on FIG. 1.

Referring to the drawings in detail, and initially to FIGS. 1 and 2 thereof, it will be seen that a differential-type or dual-gap magnetic flux-responsive head 1 that may be employed in a magnetic field detecting system according to this invention generally comprises a saturable magnetic core 2 having two coils 3 and 4 thereon, and a pair of magnetic yokes 5 and 6. As shown, yokes 5 and 6 are of U-shaped configuration and arranged in opposing relation with core 2 therebetween so that ends 7 and 8 of yokes 5 and 6 abut, and are suitably secured to opposite sides of one end portion of core 2, while the other ends 9 and 10 of yokes 5 and 6 are adjacent to the other end portion of core 2, but spaced therefrom to define the gaps 11 and 12 therebetween. Although the gaps 12 and 11 are generally referred to as "air-gaps", it is apparent that a non-magnetic material, such as, a non-magnetic alloy of copper and beryllium or a suitable plastic resin, may fill each of the gaps 11 and 12 to provide the structural rigidity for maintaining the desired gap width.

As shown particularly on FIG. 2, in a conventional construction of the core 2, the latter is constituted by one-piece core members 13 and 14 for the coils 3 and 4, respectively, with core members 13 and 14 including relatively wide end portions 15 and 16 and relatively narrow legs 17 and 18 extending between such wide end portions and having the coils 3 and 4 respectively wound thereon.

Figure 3:
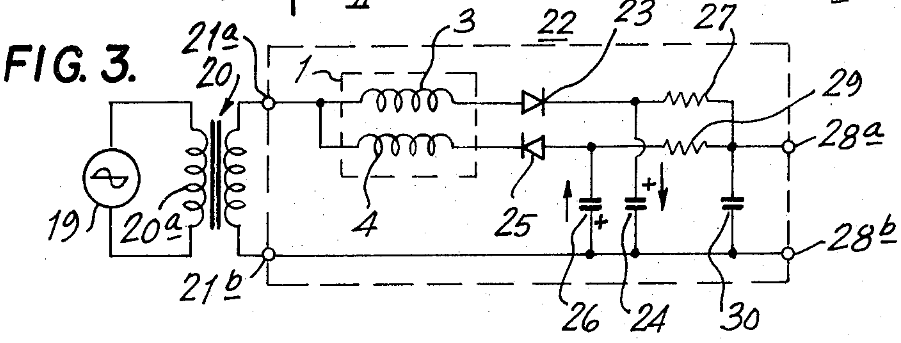
FIG. 3 is a wiring diagram showing a detecting circuit that may be used in association with the head of FIG. 1 to provide an output voltage characteristic of the magnetic flux received by the head from the source thereof.

As shown on FIG. 3, a magnetic field detecting circuit 22 for use with the head 1 has terminals 21*a* and 21*b* connected with the opposite ends of the secondary winding 20*b* of a transformer 20 having its primary winding 20*a* receiving the output of an AC generator or oscillator 19. Within circuit 22, coils 3 and 4 are connected in parallel to terminal 21*a*. Further, coil 3 is connected in series with a diode 23 and a condenser 24 to terminal 21*b*, and, similarly, coil 4 is connected in series with a diode 25 and a condenser 26 to terminal 21*b*, but with diodes 23 and 25 being conductive in opposite directions. Further, as shown, resistors 27 and 29 are connected between an output terminal 28*a* and junctions intermediate diode 23 and condenser 24 and intermediate diode 25 and condenser 26, respectively. The other output terminal 28$b$ of circuit 22 is connected to junctions between condensers 24 and 26 and terminal 21$b$, and a DC current blocking condenser 30 is connected across terminals 28$a$ and 28$b$.

With the circuit 22 as described, the current $i_a$ flows through coil 3, diode 23 and condenser 24 during one-half of the cycle of oscillator 19 and the current $i_b$ flows in the opposite direction through condenser 26, diode 25 and coil 4 during the other half of the cycle, and the oscillator has a sufficiently high frequency, for example, 100 K.Hz., in relation to the time constant of the circuit, to maintain the voltages impressed on condensers 24 and 26 in correspondence with the currents $i_a$ and $i_b$, respectively.

When the head 1 is not influenced by a magnetic field, the currents $i_a$ and $i_b$ are equal, and therefore condensers 24 and 26 are equally charged with the result that no DC voltage appears across output terminals 28$a$ and 28$b$. However, when head 1 is influenced by a magnetic field so that a direct magnetic flux is directed through core 2, for example, as indicated by the arrows H on FIG. 2, the conditions for saturation of legs 17 and 18 of core members 13 and 14 become different by reason of the fact that the fluxes, indicated by the arrows $h_a$ and $h_b$, produced by the currents $i_a$ and $i_b$ flowing through coils 3 and 4 are in opposite directions to respectively oppose and augment the direct magnetic flux H. Therefore, the coils 3 and 4 are made to have different inductances and the maximum values of currents $i_a$ and $i_b$ are accordingly different to charge condensers 24 and 26 with different voltages. The voltage difference between the charges on condensers 24 and 26 is proportionate to the direct magnetic flux H from the external source and appears as a direct voltage across output terminals 28$a$ and 28$b$. Thus, the value and direction of the direct magnetic flux from an external source can be determined by measuring the magnitude and polarity of the voltage between terminals 28$a$ and 28$b$.

Figure 4:
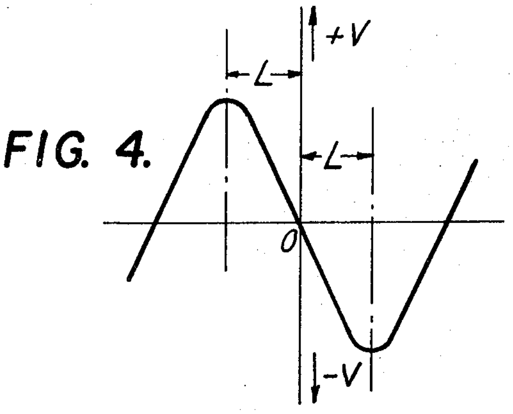
FIG. 4 is a graph showing the output voltage derived from the circuit of FIG. 3 when the head and source are displaced relative to each other as illustrated on FIG. 1.

Referring now to FIG. 1, it will be seen that, when the external magnetic source 31, for example, in the form of a permanent magnet as shown, is magnetized in the direction across gaps 11 and 12 and is disposed so that its center is aligned with the center of head 1, the fluxes H$a$ and H$b$ which respectively pass through yoke 5 and core 2 and through core 2 and yoke 6 cancel each other within core 2, and thus there is no resultant direct magnetic flux in core 2 so that no output appears at terminals 28$a$ and 28$b$. However, as the magnetic flux source 31 is displaced from the centered position relative to head 1 in the direction parallel to its magnetization, for example, to the left as viewed on FIG. 1, the magnetic flux H$a$ becomes larger than the magnetic flux H$b$ to provide a DC voltage at output terminals 28$a$ and 28$b$, which voltage reaches a maximum when source 31 attains the position indicated in broken lines at 31$a$ on FIG. 1 where its center has been displaced the distance L from the center of head 1. As shown on FIG. 4, in which the displacement of the center of source 31 relative to the center of head 1 is plotted as the abscissas and the voltage at terminals 28$a$ and 28$b$ is plotted as the ordinates, the voltage output +V decreases with displacement of source 31 to the left beyond the distance L. Also, as shown on FIG. 4, when source 31 is displaced toward the right, as viewed on FIG. 1, from its centered position with respect to head 1, a voltage −V appears at terminals 28$a$ and 28$b$, but with an opposite polarity to that of the voltage appearing as a result of the displacement to the left, by reason of the fact that the magnetic flux H$b$ becomes larger than the flux H$a$. Once again the voltage −V is maximum when the displacement toward the right attains the distance L and is reduced by further displacement, as shown on FIG. 4.

Figure 5:
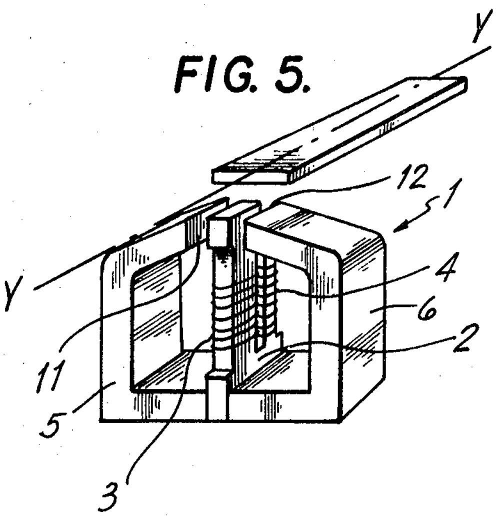
FIG. 5 is a perspective view of the head shown on FIG. 1 and a magnetic flux generating source which is elongated in the direction at right angles to the direction of its magnetization.
Figure 6:
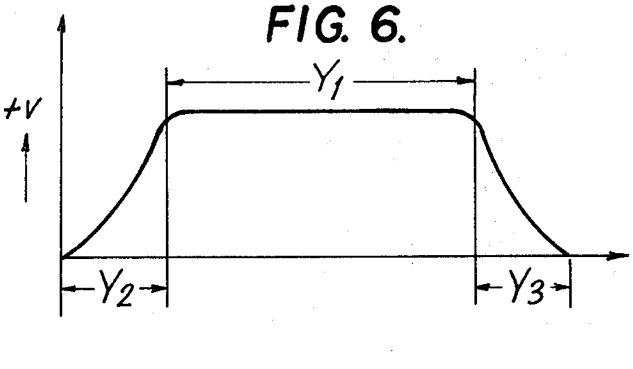
FIG. 6 is a graph illustrating the relationship of the voltage output to the relative displacement of the head and source of FIG. 5 when such relative displacement is in the direction of the longitudinal axis of the source.

Referring now to FIG. 5, it will be seen that, if the magnetic flux source 31 is of substantial length in the direction at right angles to its magnetization, for example, source 31 is in the form of an elongated strip magnetized transversely, as shown, then longitudinal displacement of source 31 in the direction of the axis Y—Y on FIG. 5, that is, in the direction at right angles to the width of gaps 11 and 12, will not change the voltage output at terminals 28$a$ and 28$b$ so long as a portion of the strip source 31 remains proximate to the head. Thus, if strip source 31 on FIG. 5 is laterally centered with respect to head 1 to provide no voltage output, longitudinal displacement of strip source 31 will not alter that zero output. Similarly, if strip source 31 is laterally displaced from its centered position with respect to head 1, for example, to the position 31$a$ on FIG. 1 so as to provide a maximum voltage output, as described with reference to FIGS. 1 and 4, that maximum voltage output will be maintained without change during displacement of strip source 31 in the direction of the axis Y—Y (FIG. 5) over the distance Y1 (FIG. 6) which corresponds to the length of strip source 31. With further displacements of strip source 31 in the direction Y—Y, the voltage output will be progressively reduced to zero over the distances Y2 (FIG. 6) which are equivalent to the dimension of head 1 in the direction Y—Y.

In accordance with this invention, a magnetic field detecting system generally comprises at least one dual-gap, magnetic flux sensitive head 1, as described above, a detecting circuit, for example, as described with reference to FIG. 3, providing a voltage output which indicates the resultant direct magnetic flux passing through core 2, and a source of magnetic flux which is magnetized in the direction across the gaps of head 1 and which is relatively displaceable with respect to the head in a direction at right-angles to the direction of magnetization so that the voltage output will constitute a signal characteristic of changes in the pattern of magnetization of the source considered in the direction of relative displacement. Thus, the wavelength of the signal is merely determined by the frequency of change of the pattern of magnetization and may be conveniently made as long or as short as desired, for example, to exercise any predetermined control function. The mentioned changes in the pattern of magnetization may be determined by the shape of the magnetic flux source considered in the direction of its relative displacement with respect to the head or by reversals of the direction of magnetization, or by combinations thereof.

Figure 7:
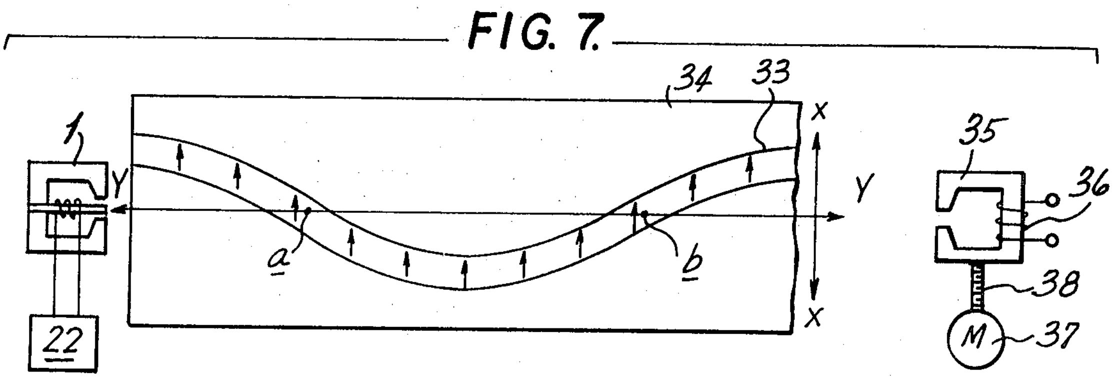
FIG. 7 is a schematic view illustrating a magnetic field detecting system in accordance with an embodiment of this invention.
Figure 8:
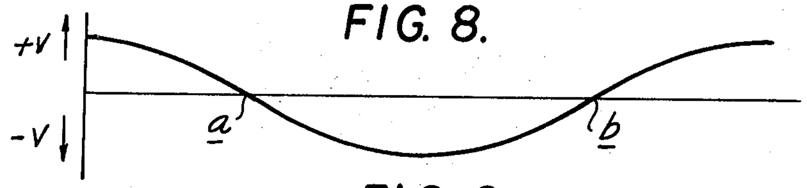
FIG. 8 is a graph illustrating the output signal from the system of FIG. 7.

Referring now to FIG. 7, it will be seen that in a magnetic field detecting system according to this invention, the magnetic flux generating source may be constituted by a magnetized track 33 recorded on a magnetic medium 34, for example, a magnetic tape, which is longitudinally displaceable, that is, in the direction indicated at Y—Y, relative to a dual-gap magnetic flux responsive head 1. The magnetization in track 33 is shown to be uniformly in one direction across the gaps of head 1, and the mangetization pattern of track 33 is determined by varying the lateral position of track 33 on tape 34 at the various locations along the tape. Thus, for example, as shown, track 33 may have a sinusoidal configuration so as to be centered with respect to head 1 at the locations $a$ and $b$ along the tape, while at other locations along the tape the center of track 33 is more or less displaced towards one side or the other of the center of head 1. With the track configuration shown on FIG. 7, relative displacement of tape 34 and head 1 in the direction Y—Y will result in an output signal from the detecting circuit 22 having the wave form shown on FIG. 8. The wave form of the output signal can be altered merely by changing the configuration of the magnetized track 33 on tape 44.

Referring again to FIG. 7, it will be seen that the magnetized track 33 constituting the magnetic flux generating source of the system may be conveniently provided on tape 34 by means of a recording head 35 which is suitably mounted for lateral movement, that is, in the direction X—X, relative to tape 34 and which is provided with a coil 36 to which a DC current is supplied. Lateral movement of head 35 may be effected by a suitably energized reversible motor 37 driving a screw device 38 connected with head 35 to displace the latter in the direction X—X in response to operation of motor 37. With the arrangement shown, magnetized track 33 is formed on tape 34 by effecting relative displacement of the tape 34 and recording head 35 in the direction Y—Y, and by simultaneously reciprocating head 35 in the direction X—X while a DC current is supplied to coil 36.

Since the configuration of track 33 is determined only by the speed of relative displacement of tape 34 and recording head 35 in the direction Y—Y and by the movements imparted to head 35 in the direction X—X, it is apparent that any desired wave form can be given to the output signal subsequently derived as a result of the detection by dual-gap head 1 of the magnetic flux received from magnetized track 33.

Figures 9, 10, 14, 15, 16A, 16B:
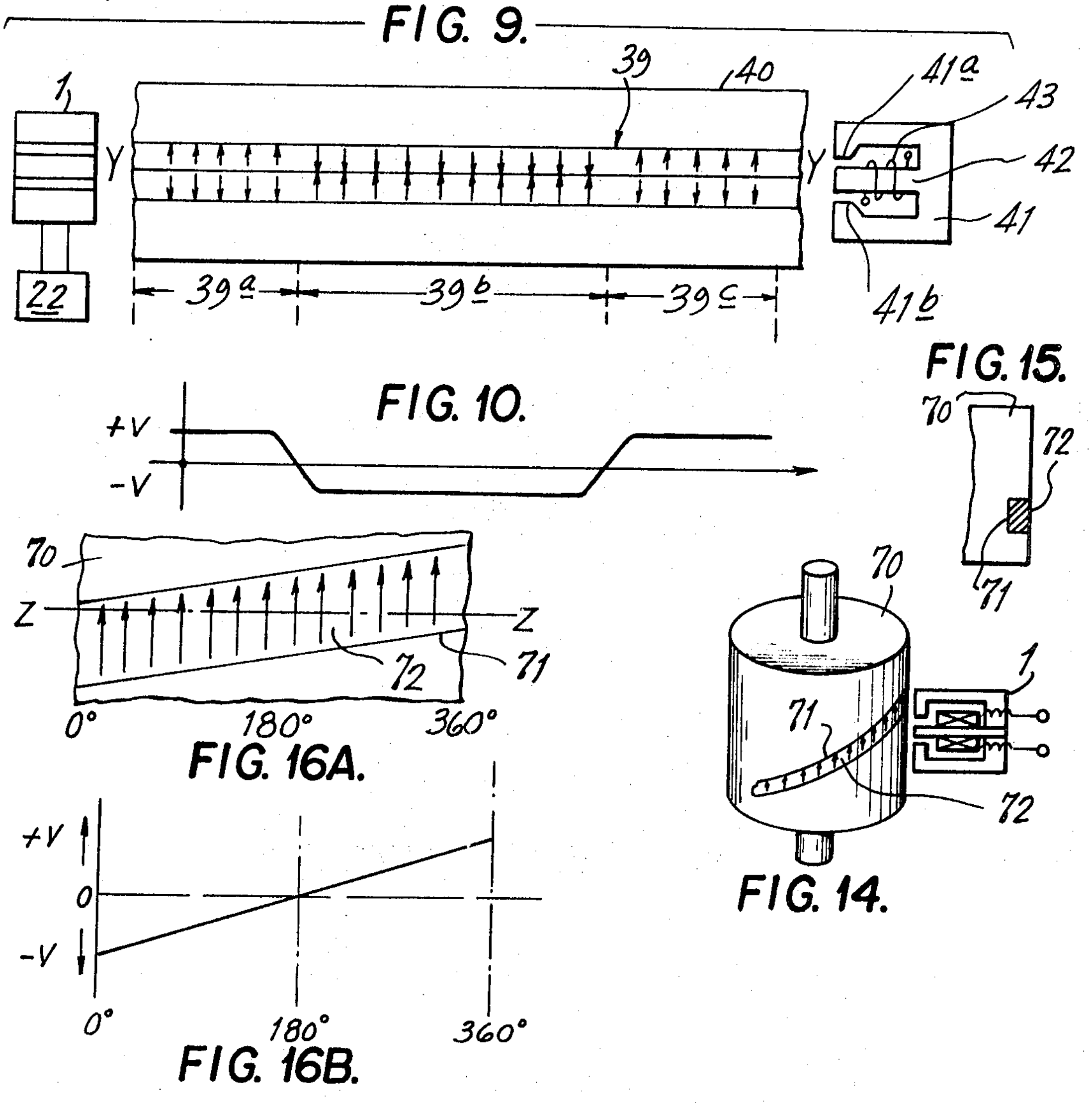
FIG. 9 is a schematic view illustrating a magnetic field detecting system in accordance with another embodiment of this invention.
FIG. 10 is a graph illustrating the output signal from the system of FIG. 9.
FIG. 14 is a schematic perspective view illustrating a magnetic field detecting system according to still another embodiment of this invention.
FIG. 15 is a detail sectional view showing the manner in which the magnetic flux generating source is provided in the arrangement of FIG. 14.
FIG. 16A is a developed view showing the pattern of magnetization of the magnetic flux generating source provided in the system of FIG. 14.
FIG. 16B is a graph illustrating the output signal derived when the pattern of magnetization is as shown on FIG. 16A.

Referring now to FIG. 9, it will be seen that, in a magnetic field detecting system according to another embodiment of this invention, the magnetic flux generating source is in the form of a laterally magnetized straight track 39 extending longitudinally on a magnetic medium or tape 40 with the median of track 39 being centered with respect to the head 1, and with the head 1 and magnetic tape 40 being relatively moved in the direction Y—Y, that is, in the longitudinal direction of the tape. In this embodiment, the magnetization pattern for predetermining the output signal from the detecting circuit 22 is obtained by changing the directions of lateral magnetization of track 39 in successive portions 39*a*, 39*b* and 39*c* of the track. Thus, for example, in portions 39*a* and 39*c* of track 39, the two halves of track 39 at opposite sides of the longitudinal median thereof may be magnetized in laterally outward directions, whereas, in the portion 39*b* of the track, the two halves of the latter at opposite sides of the longitudinal median are magnetized laterally inward toward each other. With the magnetization pattern illustrated on FIG. 9, relative displacement of head 1 and tape 40 in the direction Y—Y will result in the production of the output signal illustrated on FIG. 10.

The magnetization pattern of track 39, as shown on FIG. 9, may be conveniently produced on tape 40 by suitably moving the latter, in the direction Y—Y relative to a recording head 41 having dual-gaps 41*a* and 41*b* defined at opposite sides of a central core portion 42 which is centered with respect to the longitudinal median of the track to be formed on tape 40. A coil 43 is wound on central core portion 42 and is supplied with a DC current of reversible polarity. Thus, when the DC current flows through coil 43 in one direction, the halves of track 39 at opposite sides of the longitudinal median are magnetized in laterally outward directions, as at 39*a* and 39*c*, whereas, when the current flows through the opposite direction in coil 43, the halves of the track 39 are magnetized in the laterally inward direction, as at 39*b*. Accordingly, during the relative displacement of tape 40 and head 41, the current flowing through coil 43 can be reversed at suitable intervals to determine the directions of magnetization in the respective portions of track 39 and the lengths of such portions.

Figures 11, 12A, 12B, 13A, 13B, 17A, 17B:
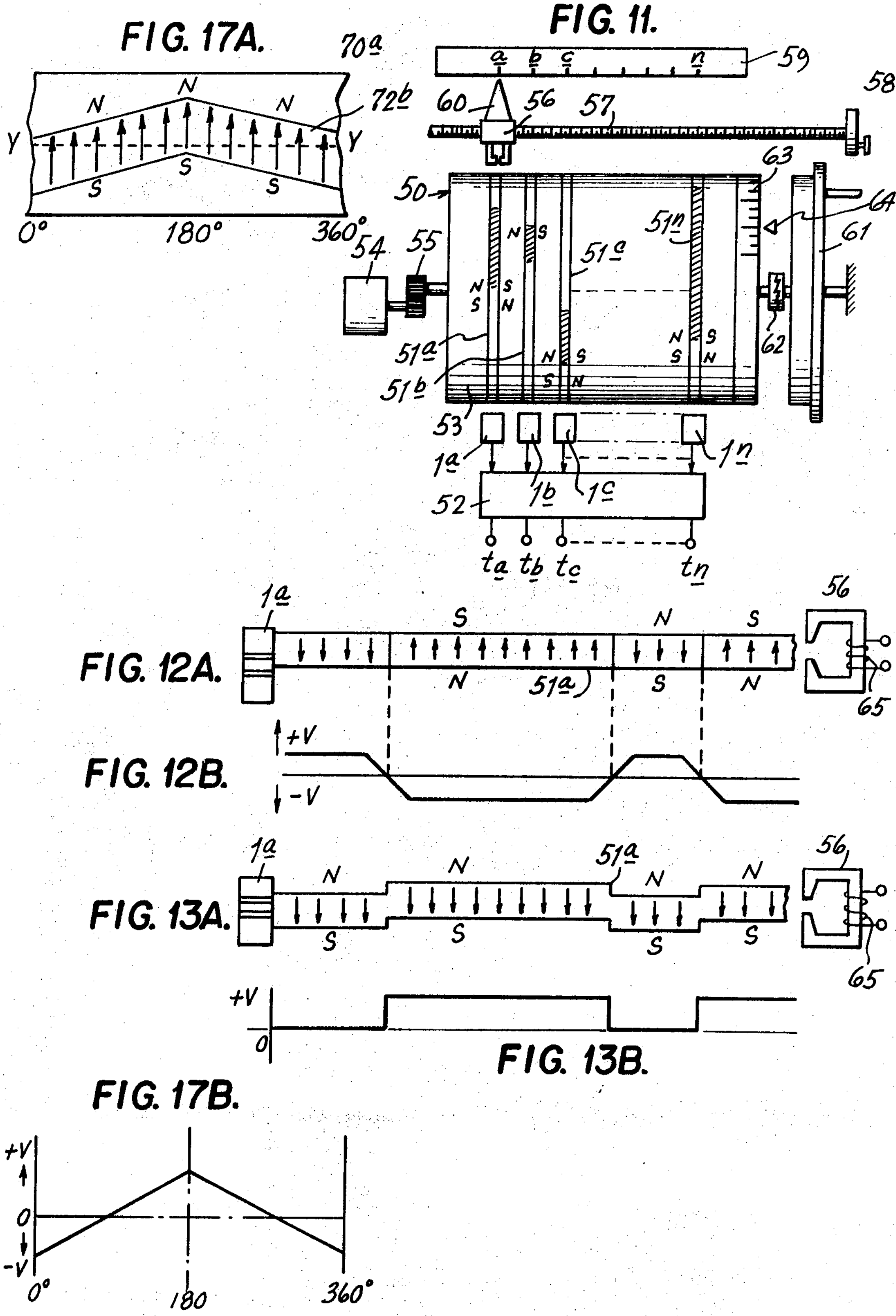
FIG. 11 is a schematic view illustrating a magnetic field detecting system in accordance with still another embodiment of this invention, and which is adapted for use as a programming device for controlling multiple functions.
FIG. 12A is a schematic view illustrating one of the heads and an associated magnetic flux generating source that may be included in the programming device of FIG. 11, and showing the manner in which the pattern of magnetization of the source may be arranged to provide a desired output signal for controlling a related function.
FIG. 12B is a graph illustrating the output signal derived from a magnetic flux generating source having the pattern of magnetization illustrated on FIG. 12A.
FIGS. 13A and 13B are views similar to FIGS. 12A and 12B, respectively, but show another pattern of magnetization and the resulting output signal.
FIGS. 17A and 17B are views similar to FIGS. 16A and 16B, respectively, but showing another pattern of magnetization and the respective output signal.

Referring now to FIG. 11, it will be seen that, in a magnetic field detecting system according to still another embodiment of this invention, and which is adapted to operate as a programming device for controlling a plurality of functions or operations, for example, the successive steps in an automated process or the various functions of an automated machine, there is a plurality of dual-gap magnetic flux responsive heads 1*a*, 1*b*, 1*c*---1*n* arranged adjacent the surface of a rotatable drum 50 and being axially spaced apart along the latter so as to respectively detect the magnetic flux from corresponding magnetic flux generating sources 51*a*, 51*b*, 51*c*---51*n* extending circumferentially about drum 50. The several heads 1*a*–1*n* may be similar to the head 1 described above with reference to FIGS. 1 and 2, are arranged with their gap widths extending in the axial direction of drum 50, and such heads are further connected with detecting circuits, which may be similar to the circuit described with reference to FIG. 3, and which are included in an assembly 52 having respective output terminals $t_a$---$t_n$ at which output signals are provided corresponding to the magnetic flux received by the respective heads.

The several magnetic flux generating sources 51*a*–51*n* may be constituted by circumferential tracks on a magnetic sheet 53 extending around drum 50, and in which tracks the magnetic sheet is magnetized laterally, that is, in the direction of the axis of drum 50 which corresponds to the direction across the gaps of the respective dual-gap magnetic flux responsive heads. During operation of the system shown on FIG. 11, drum 50 may be rotated by a motor 54 through gearing 55, for example, so as to effect a single complete revolution in 24 hours or in any other predetermined time required for the completion of the program to be represented by the patterns of magnetization of the sources 51*a*–51*n*.

In order to produce the magnetized tracks in sheet 53 constituting the sources 51*a*–51*n*, the system of FIG. 11 further includes a recording head 56 disposed adjacent the surface of drum 50 and being displaceable axially along the latter by means of a screw 57 which is turnable by a hand wheel 58. A fixed scale 59 may be provided extending parallel to screw 57 and cooperating with an index 60 on head 56 to indicate the positioning of the latter along drum 50. Further, a hand wheel 61 may be separably coupled to drum 50, as through a separable coupling 62, to effect rotation of drum 50 during the recording of a track on sheet 53, and the drum 50 may further have a circumferentially extending scale 63 thereon cooperating with a fixed index 64 to indicate the time period corresponding to the portion of the track in which head 56 is recording at any instant.

As shown particularly on FIG. 12A, each of the tracks 51*a*–51 may be axially located on sheet 53 so that the center of the track is offset with respect to the center of the respective head 1*a*–1*n* and, in that case, the pattern of magnetization may be constituted by reversals of the direction of magnetization in successive circumferential portions of the track, for example, to produce the output signal as shown on FIG. 12B. In the case where the pattern of magnetization is to include reversals of the direction of magnetization, as on FIG. 12A, the recording head 56 may be fixedly located during the recording in any particular track, and the coil 65 of the recording head is then fed a direct current, the polarity of which is reversed at specified times during the recording operation so as to provide the desired magnetization pattern.

Alternatively, as shown on FIG. 13A, the recording head 56 may be axially moved to different positions along drum 50 during the recording of successive portions of a track, for example the track 51*a*, so that some of the portions of the track are centered with respect to the center of the respective dual-gap head 1*a* and other portions of the track have the center thereof laterally displaced with respect to the center of the head 1*a*, for example, so as to provide an output signal as shown on FIG. 13B. Of course, when the magnetization pattern is as shown on FIG. 13A, the DC current is supplied to coil 65 of the recording head 56 in only one direction, since the direction of magnetization is uniform along the entire length of the track.

Of course, the system illustrated in FIG. 11 may further be provided with an erasing head (not shown) by which the magnetization patterns recorded in one or more of the tracks on sheet 53 may be conveniently erased when the control program is to be changed. Further, it will be apparent that the sheet 53 mounted on the drum 50 may be replaced by an endless magnetic belt passing around suitably driven rollers and on which tracks are recorded, as described above with reference to the sheet 53. Further, in place of the magnetic sheet 53 suitably secured on the surface of drum 50, the latter may be provided with axially spaced circumferential grooves filled with a so-called rubber magnetic material which is suitably magnetized, for example, as on FIG. 12A, to provide the desired magnetization pattern.

Referring now to FIG. 14, it will be seen that, in a system according to this invention, the dual-gap magnetic flux responsive head 1 may be disposed adjacent the surface of a non-magnetic drum 70 which is rotatably mounted with its axis extending across the gaps of head 1. In this embodiment, the magnetic flux generating source is constituted by a rubber magnet 72 magnetized parallel to the axis of drum 70 and being located in a helical groove 71 formed in the surface of drum 70, as shown on FIGS. 14 and 15. Thus, when drum 70 is turned about its axis, the portion of magnet 72 which is adjacent head 1 will have its center variously positioned with respect to the center of head 1 which is represented at Z—Z on FIG. 16A. Thus, if it is assumed that the center of magnet 72 will coincide with the center of head 1 at the position indicated as 180° on FIGS. 16A and 16B, then the output voltage derived from head 1 will be zero at that position and will increase in the negative and positive directions, as shown on FIG. 16B, as drum 70 is turned in one direction or the other, respectively, from the 180° position. Of course, if the pattern of magnet 72 extending around drum 70 is changed, for example, to the configuration shown on FIG. 17A, then the output signal from the dual-gap head will be similarly altered, as shown on FIG. 17B.

It will be obvious that, in all of the above described embodiments of this invention, the output signal may be given any desired wave form to correspond to a desired control signal.

Although illustrative embodiments of the invention have been described in detail herein with reference to the drawings, it is apparent that the invention is not limited to those precise embodiments, and that various changes and modifications may be effected therein by one skilled in the art without departing from the scope or spirit of the invention.

What is claimed is:

1. A system for producing an electrical output signal in correspondence with a magnetic recording, comprising a dual-gap, magnetic flux responsive head, and a magnetic record member, said head and record member being relatively movable in a direction parallel to the gaps of said head, said record member having at least one record track of substantial length in said direction of relative movement and being magnetized transversely with respect to said gaps so that said head produces an electrical output in dependence on characteristics of said record track consisting of the direction of magnetization in the portion of said track adjacent said head and the lateral position of said portion of the track with respect to said head considered at right angles to said direction of relative movement, at least one of said characteristics of the record track being varied in successive portions of said track to correspondingly vary said electrical output.

2. A system according to claim 1, in which said successive portions of said track have magnetizations of reversed polarity.

3. A system according to claim 1, in which said successive portions of said track are displaced relative to each other transversely with respect to said direction of relative movement.

4. A system according to claim 1, in which said record track is constituted by a magnetic recording on a magnetic medium.

5. A system according to claim 4, further comprising a magnetic recording head operative to produce said magnetic recording in said track during relative displacement of said magnetic medium and recording head in said direction of relative movement.

6. A system according to claim 5, in which said recording head has an energizing coil through which a direct current may pass selectively in opposite directions so that successive portions of said track may have magnetizations of reversed polarity.

7. A system according to claim 5, in which said recording head is further displaceable relative to said medium in the direction transversely related to said track so that said successive portions of said track are displaced relative to each other transversely with respect to said direction of relative movement of said dual-gap magnetic flux responsive head and said record member.

8. A system according to claim 5, in which said recording head has dual-gaps and an energizing coil through which a direct current is selectively passed in opposite directions so that, when said current flows through said coil in one direction, said recording head effects magnetization of the opposed halves of said track in laterally outward directions and, when said current flows through said coil in the opposite direction, said recording head effects magnetization of said halves of the track in laterally inward directions, and in which said dual-gap magnetic flux responsive head is located with its center in alignment with the longitudinal median of said track, and said successive portions of said track are recorded in response to said direct current flowing through said coil of the recording head in said one direction and in said opposite direction, respectively.

9. A system according to claim 1, in which said record member is constituted by an elongated magnet carried by a non-magnetic base and being magnetized transversely with respect to said direction of relative movement.

10. A system according to claim 9, in which said elongated magnet is uniformly magnetized along its length, and successive portions of said magnetic, considered along its length, are displaced relative to each other transversely with respect to said direction of relative movement.

11. A system according to claim 1, in which there is at least one additional dual-gap, magnetic flux responsive head and a respective additional magnetic record member, as aforesaid, with said additional record member and the first mentioned record member having selectively different variations of at least one of said characteristics in successive portions thereof so that said additional head and the first mentioned head can provide respective control signals as a function of time in response to said relative movement of the heads and respective record members.

12. A system according to claim 11, in which said record members are constituted by respective magnetic recordings on a magnetic medium.

13. A system according to claim 12, in which said magnetic recordings are in respective tracks which are laterally spaced apart on said recording medium and extend generally in said direction of relative movement.

14. A system according to claim 13, further comprising magnetic recording head means operative to produce said magnetic recording in each of said tracks during relative displacement of said medium and said recording head means in said direction of relative movement.

15. A system according to claim 14, in which said recording head means includes a single magnetic recording head and means movably mounting said recording head for selective positioning of the latter to record in any one of said tracks.

* * * * *